(12) United States Patent
Esposito (10) Patent No.: US 9,467,188 B1
(45) Date of Patent: Oct. 11, 2016

(54) CELL PHONE TABLE

(71) Applicant: Charles Esposito, Hasbrouck Heights, NJ (US)

(72) Inventor: Charles Esposito, Hasbrouck Heights, NJ (US)

(*) Notice: Subject to any disclaimer, the term of this patent is extended or adjusted under 35 U.S.C. 154(b) by 0 days.

(21) Appl. No.: 14/690,980

(22) Filed: Apr. 20, 2015

(51) Int. Cl.
| | |
|---|---|
| *H04B 7/00* | (2006.01) |
| *H04M 1/04* | (2006.01) |
| *H04B 1/3877* | (2015.01) |
| *H04M 1/725* | (2006.01) |

(52) U.S. Cl.
CPC ....... *H04B 1/3877* (2013.01); *H04M 1/72527* (2013.01)

(58) Field of Classification Search
CPC ........ H04B 7/00; H04M 1/04; H04M 1/0297
USPC .................................... 455/41.2, 556.1, 557
See application file for complete search history.

(56) References Cited

U.S. PATENT DOCUMENTS

| | | | | |
|---|---|---|---|---|
| 8,135,342 B1* | 3/2012 | Harold | ................. | H04W 4/001 455/41.1 |
| 8,879,987 B1* | 11/2014 | Harold | ................. | H04W 4/001 358/1.15 |
| 2006/0105718 A1* | 5/2006 | Ozluturk | ............... | H04W 8/005 455/67.11 |
| 2012/0202427 A1* | 8/2012 | Gioscia | ................ | G06F 1/1632 455/41.2 |
| 2012/0276977 A1* | 11/2012 | Leczek | ............... | G07F 17/3239 463/17 |
| 2013/0228970 A1* | 9/2013 | Stellenberg | ............... | A63F 7/26 273/121 A |
| 2015/0001796 A1* | 1/2015 | Stellenberg | ......... | A63F 3/00643 273/121 A |

\* cited by examiner

*Primary Examiner* — Blane Jackson
(74) *Attorney, Agent, or Firm* — Howard M. Cohn; Daniel M. Cohn (57) ABSTRACT

A cell phone table to interface with a mobile device. The cell phone table includes a mobile device electronically connected to the cell phone table. A touch sensitive screen is disposed upon an upper surface of the cell phone table for interacting with content on the mobile device. A support structure is mounted beneath the cell phone table to hold electronic components which operate and power the cell phone table, and a plurality of legs support the cell phone table and touch sensitive screen.

16 Claims, 6 Drawing Sheets

CELL PHONE TABLE

TECHNICAL FIELD OF THE INVENTION

The present invention relates to a cell phone table and more particularly to a cell phone table with a docked mobile device.

BACKGROUND OF THE INVENTION

As electronic technology rapidly advances, consumptive electronic appliances are becoming a part of the modern life, and portable electronic products with varied functions are being developed correspondingly. For the purpose of convenience, more portable electronic products which are further integrated with multiple functions have been brought forth to the consumers. With the development of science and technology and the improvement of people's standard of living, a mobile phone has become an indispensable important communications tool in a person's life. A mobile phone is an electronic appliance through which a user may conduct radio communication with others. Radio communication includes for example, voice calling, message transmission, file transferring, video calling, camera functions, and the like. Further, the mobile phone may also serve as a personal assistant by performing phone number management and personal schedule management.

Mobile phones tend to be compact, slim, portable, light appliances. They also are moving toward providing multimedia availability and a wider variety of services, such as games and other forms of entertainment. In the future, the mobile phone may not have only a simple function for voice calling, but also may have a multi-function including video calling, gaming, Internet, camera, and the like.

SUMMARY OF THE INVENTION

According to an embodiment of the present invention, there is disclosed a cell phone table to interface with a mobile device. The cell phone table includes a mobile device electronically connected to the cell phone table. A touch sensitive screen is disposed upon an upper surface of the cell phone table for interacting with content on the mobile device. A support structure is mounted beneath the cell phone table to hold electronic components which operate and power the cell phone table, and a plurality of legs support the cell phone table and touch sensitive screen.

According to another embodiment of the present invention, there is disclosed a cell phone table to interface with a mobile device and interact with content on the mobile device. The cell phone table includes a mobile device that is electronically connected to the cell phone table. A display screen is embedded within an upper surface of the cell phone table to display identical with a display of the mobile device, and a keypad device mounted on the upper surface of the cell phone table for receiving user input to modify and interact with the mobile device. A support structure is mounted beneath the cell phone table adapted to house all of electronics which operate and power the cell phone table, and a plurality of legs support the cell phone table, the key pad device and the display screen.

BRIEF DESCRIPTION OF THE DRAWINGS

The structure, operation, and advantages of the present invention will become further apparent upon consideration of the following description taken in conjunction with the accompanying figures (Figs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE PREFERRED EMBODIMENTS

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention. In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

Mobile phones are designed to be small and handheld. Almost all mobile phones feature a digital display screen such as an LCD display that facilitates control of the device by displaying text commands, options and images to a user. In addition to control functions, portable device screens are becoming increasingly responsible for providing display of photographs, playback of movies and the real-time action of video games. These mobile phones are often sized so that they may be stored in a user's pocket or handbag. The size of most mobile phones necessitates the use of small display components. This results in the presentation of text and images in small dimensions. The small size of visual depictions can be problematic for users with low vision or trouble seeing at close ranges. For these users, the control of their portable electronic device can be exceedingly difficult without the use of visual aids.

The cell phone table 10 is designed to alleviate issues with the small size and readability of a mobile device 12. A user of the cell phone table 10 can avoid the fatigue due to long-term viewing of the small-sized LCD screen 14 of the mobile device 12, as well as the unpleasant experience of viewing multimedia content on the small-sized LCD screen. Additionally, the conventional mobile phone has another disadvantage in that the displayed section is not easily adjustable due to the resource limitations of the mobile phone device.

Figure 1:
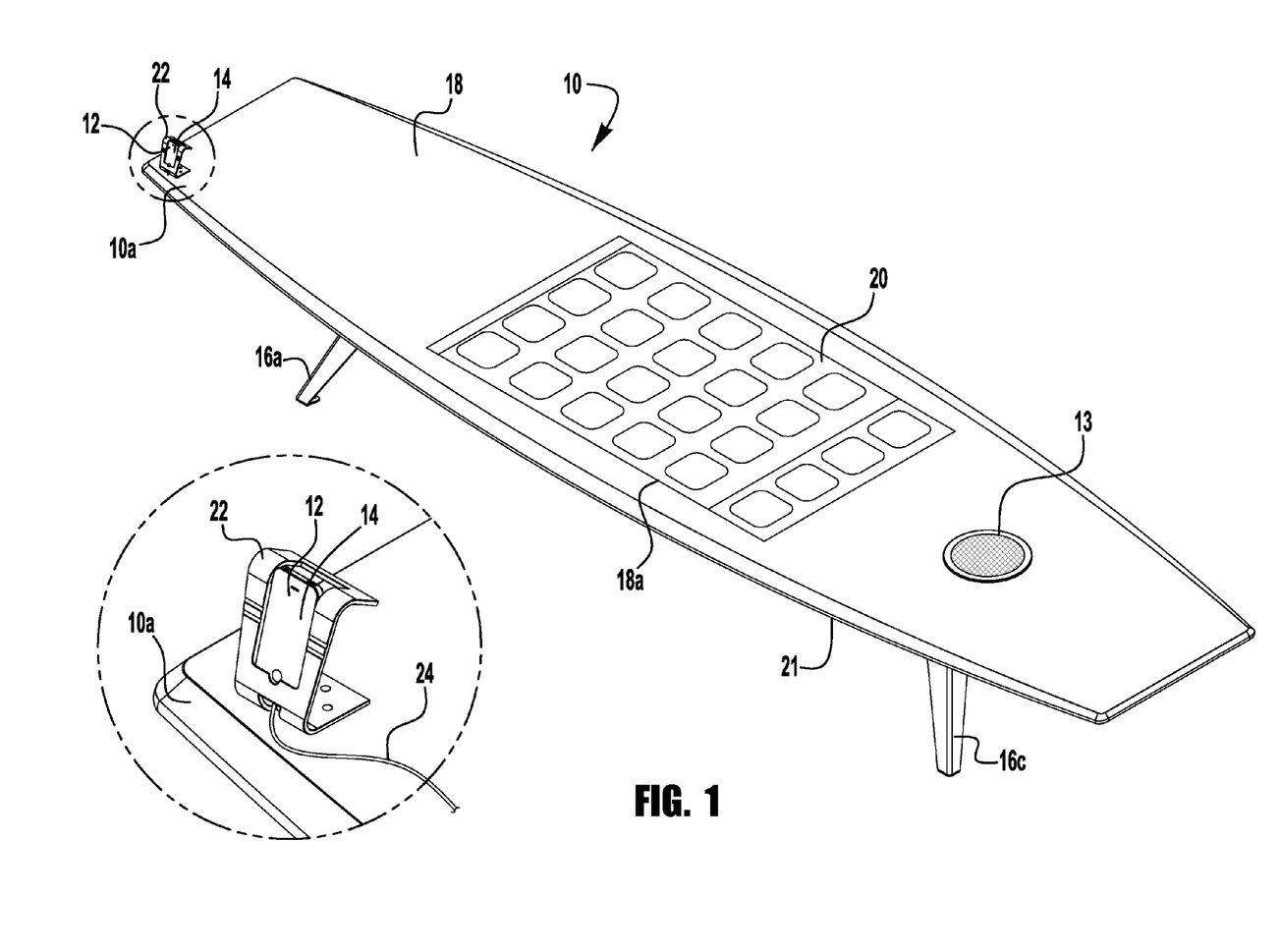
FIG. 1 is a front three-dimensional view of a first embodiment of the cell phone table with a docked mobile device, in accordance with the present invention.

As illustrated in FIG. 1, the cell phone table 10 is designed to interface with a mobile device 12, to modify and interact with content on the mobile phone. By virtue of establishing a connection between the mobile device 12 and the cell phone table 10, an image as shown on the mobile device may also be viewed on the cell phone table. The user will have the ability to control the content and features on the mobile device 12 with the cell phone table 10. The user may modify the content on the mobile device 12 with the cell phone table 10, which may in turn cause the modified content to be displayed on the cell phone table. Alternatively, the user may modify the content directly on the mobile device 12, which may in turn cause the modified content to be displayed on the cell phone table 10. Further, the cell phone table 10 can include a microphone 13 to allow a user to speak into the table when making a phone call, or otherwise speak commands into the table.

As used herein, the term "mobile device" may refer to a portable device that may include a processor, a memory, and a display for enabling a user to interact with software applications running on, or in association with, other devices, such as display devices. Example mobile devices may include, but are not limited to, smart phones, other telephones with wireless communication capability, personal digital assistants (PDAs), tablet PCs, or any other computing device (wired or wireless) with network access for communicating over a private or public network, such as the Internet, WiFi, Bluetooth, or a LAN.

As illustrated, the cell phone table 10 is structured with a plurality of legs 16a, 16b, 16c, and 16d (16a-16d), a support structure 21 mounted beneath the cell phone table for housing electronics, and an upper table surface 18. The plurality of legs 16a-16d support the upper surface 18. The cell phone table 10 may be constructed of any desired material, such as wood, metal, plastic polymer, or any combination thereof. As illustrated in the first embodiment of FIG. 1, each of the four legs 16a-16d is of approximately the same height, with a range between 20 inches to 36 inches. However, the rear legs may also be designed to be longer than the front two legs 16a and 16b, such that the cell phone table 10 is disposed at an elevated angle for ease of use.

Disposed on the upper table surface 18 is a large touch sensitive screen 20, such as for example 18 inches by 18 inches for receiving user input. Thus, the user can directly operate video games, document presentations, or other applications by inputting commands directly onto the touch sensitive screen 20, which in turn directs the mobile device 12. Typically, there will be a recess 18a within the upper table surface 18 which houses the touch sensitive screen 20. This recess 18a allows the touch sensitive screen 20 disposed thereupon to be flush with the upper table surface 18.

In the present embodiment, it is envisioned that the touch sensitive screen 20 has processing capabilities. The touch sensitive screen 20 serves as a device for displaying images purely or substantially based upon signals generated by and received from the mobile device 12 and communicated to the touch sensitive screen 20 of the phone table 10, and relaying commands that are executed by the mobile device 12. The touch sensitive screen 20 has further processing capabilities, including adjusting standard image characteristics such as tint, brightness, contrast and black and white versus color display, etc. However, it is within the terms of the embodiment of the cell phone table 10 that the touch sensitive screen 20 can instead be a "smart" device having more processing capabilities.

In addition to being able to output images, the touch sensitive screen 20 is also able to receive or sense touch type inputs as provided by way of a user's finger or other touch input device such as a stylus (not shown).

The mobile device 12 may electronically connect to the cell phone table 10 in any desired appropriate fashion. For example, as illustrated in FIG. 1, mobile device 12 interfaces with the table 10 utilizing a docking station 22. Docking station 22 is a housing which may include a upper of external connectors 25 that may be used to connect the cell phone table 10 to the mobile device 12. For example, these connectors may include one or more video connectors 25a, audio connectors 25b, a network connector (not shown), or other connectors. The docking station 22 may be placed in any desired location on the cell phone table 10, such as corner 10a. As illustrated, the docking station 22 is disposed on upper of the upper table surface 18 but it is within the terms of the embodiment that the docking station be disposed within a recess (not shown) of the upper table surface.

Typically, the connectors 25 within the docking station 22 will be attached to a wire 24 that is connected directly to the touch sensitive screen 20. Once the mobile device 12 is placed in the docking station 22, the cell phone table 10 may use the touch sensitive screen 20 to access and command the connected mobile device. The touch sensitive screen 20 will be utilized to display what would normally be displayed on the display 14 of the mobile device 12. In some implementations, the docking station 22 may also include the ability to charge a battery of the mobile device 12 when it is connected to the docking station. It should be noted that the embodiment contemplates that the mobile device 12 is connected directly to the touch sensitive screen 20 via the wire 24 without the use of the docking station 22.

Figure 2:
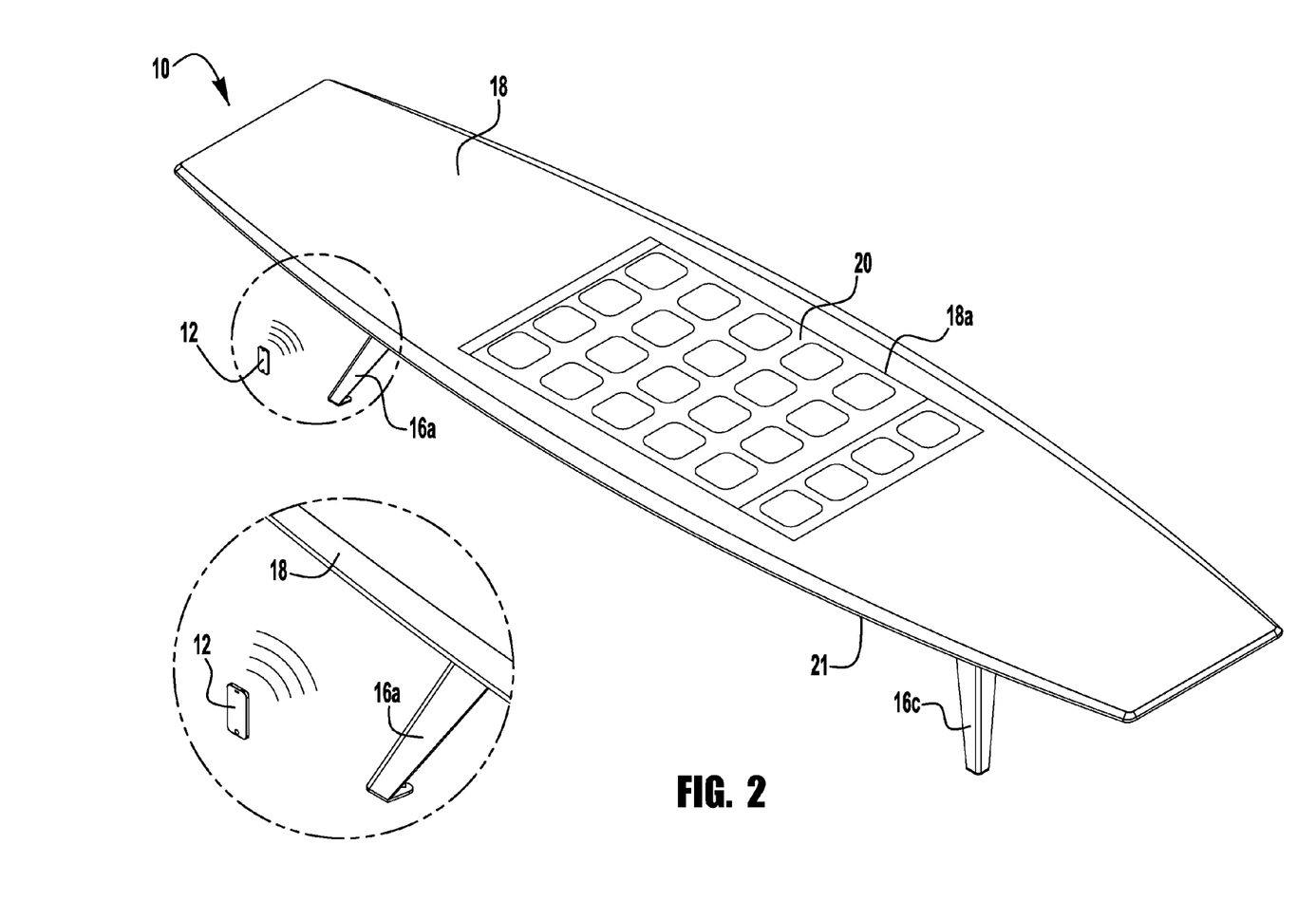
FIG. 2 is a front three-dimensional view of a first embodiment of the cell phone table with a wirelessly connected mobile device, in accordance with the present invention.

Alternatively, the mobile device 12 may be connected wirelessly to the touch sensitive screen 20 of the cell phone table 10, as illustrated in FIG. 2. The content from the mobile device 12 that is controlled on the touch sensitive screen 20 can be accessed from a Bluetooth connection, a Wi-Fi connection, a cellular communications connection, or any other wireless connection. After the mobile device 12 is wirelessly connected to the cell phone table 10, the touch sensitive screen 20 may be utilized to access and command the connected mobile device.

After a user connects the mobile device 12 to the touch sensitive screen 20 of the cell phone table 10, either with a wire or wirelessly, the mobile device can automatically transmit data to the touch sensitive screen in accordance with the respective video standard. The mobile device 12 can automatically detect that the touch sensitive screen 20 is an external monitor, and switch to the appropriate resolution.

Figure 6:
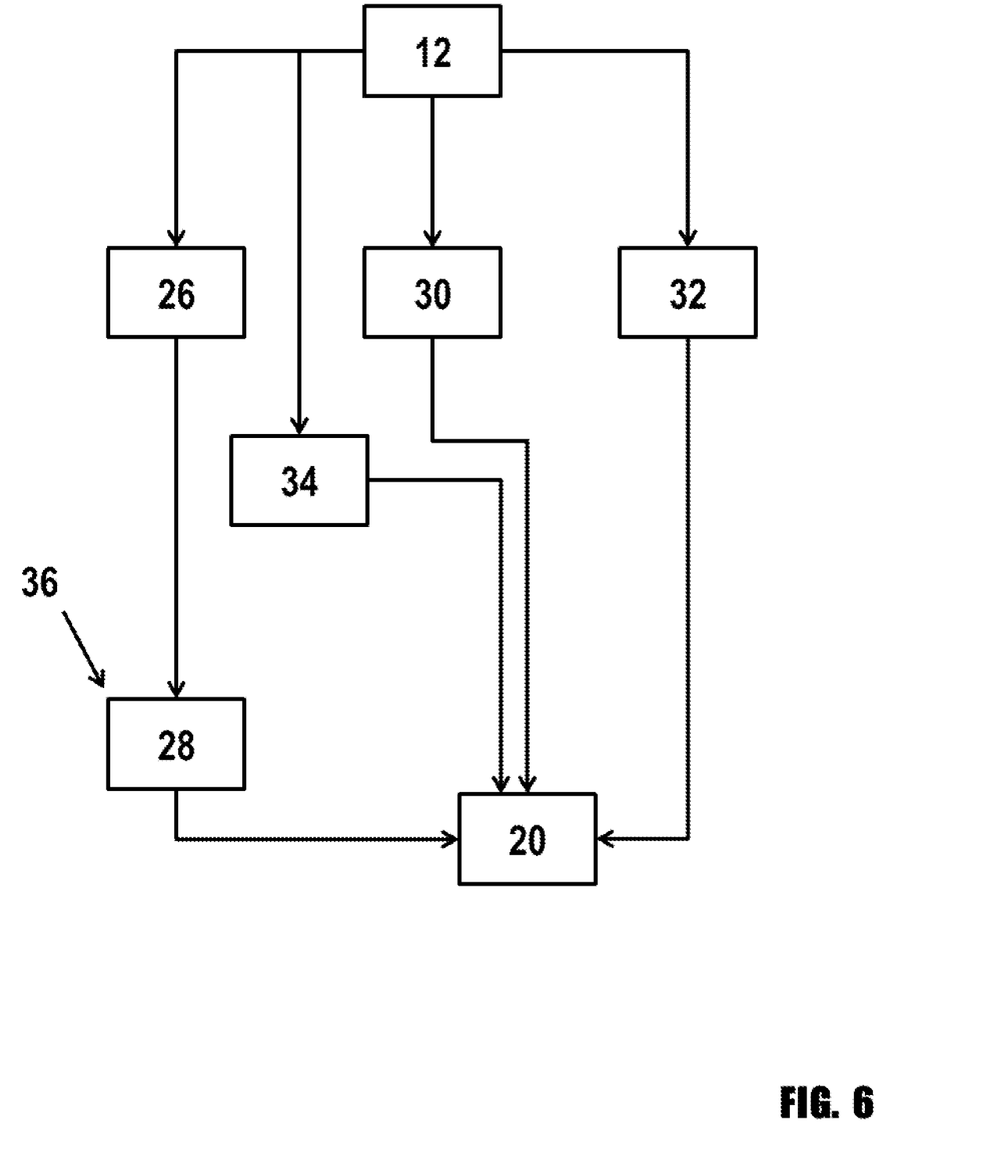
FIG. 6 is a view of the electronic components of the first embodiment of the cell phone table, in accordance with the present invention.

Typically, the touch sensitive screen 20 includes one or more control server devices 26 and one or more relay server devices 28 as seen in FIG. 6. The control server device 26 may communicate with multiple relay server devices 28 to select one or more of the relay server devices for transferring or relaying content between the mobile device 12 and the touch sensitive screen 20. Further, the touch sensitive screen 20 may include a video processor 30, graphics accelerator 32, and a decoder 34 that can process the content received from the mobile device 12 and blend the content into a merged graphic and video frame to be placed in a data memory. The touch sensitive screen 20 may also include a graphics processing unit to display the mobile device 12 content upon the touch sensitive screen 20. These electronics or electronic components 36 may be housed within a support structure 21 mounted beneath the cell phone table of the cell phone table 10, generally located beneath the upper table surface 18. Typically, the support structure 21 mounted beneath the cell phone table is a recess that is designed to accommodate any electronic components 36 which operate and power the cell phone table 10.

Figure 3:
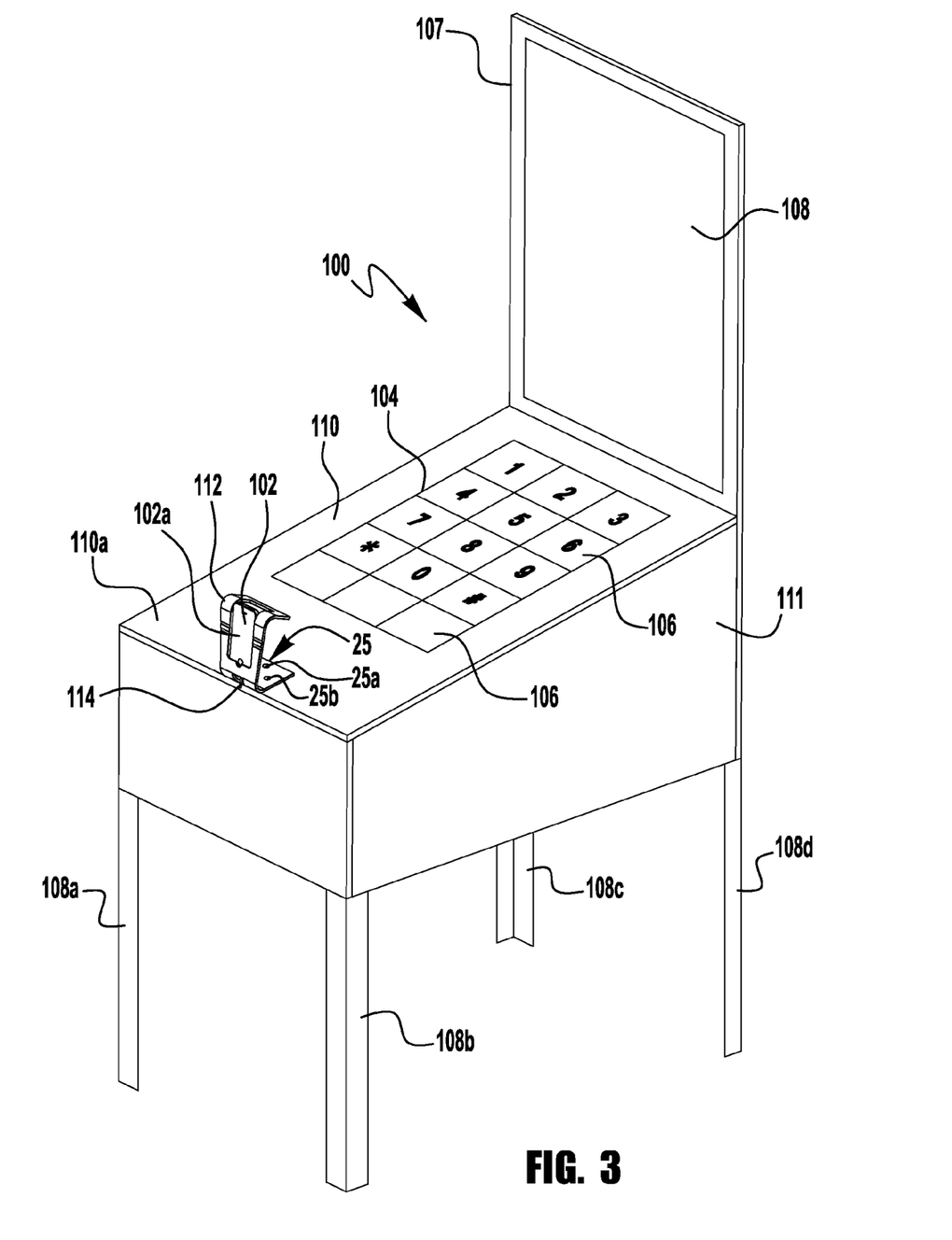
FIG. 3 is a front three-dimensional view of a second embodiment of the cell phone table with a docked mobile device, in accordance with the present invention.
Figure 4:
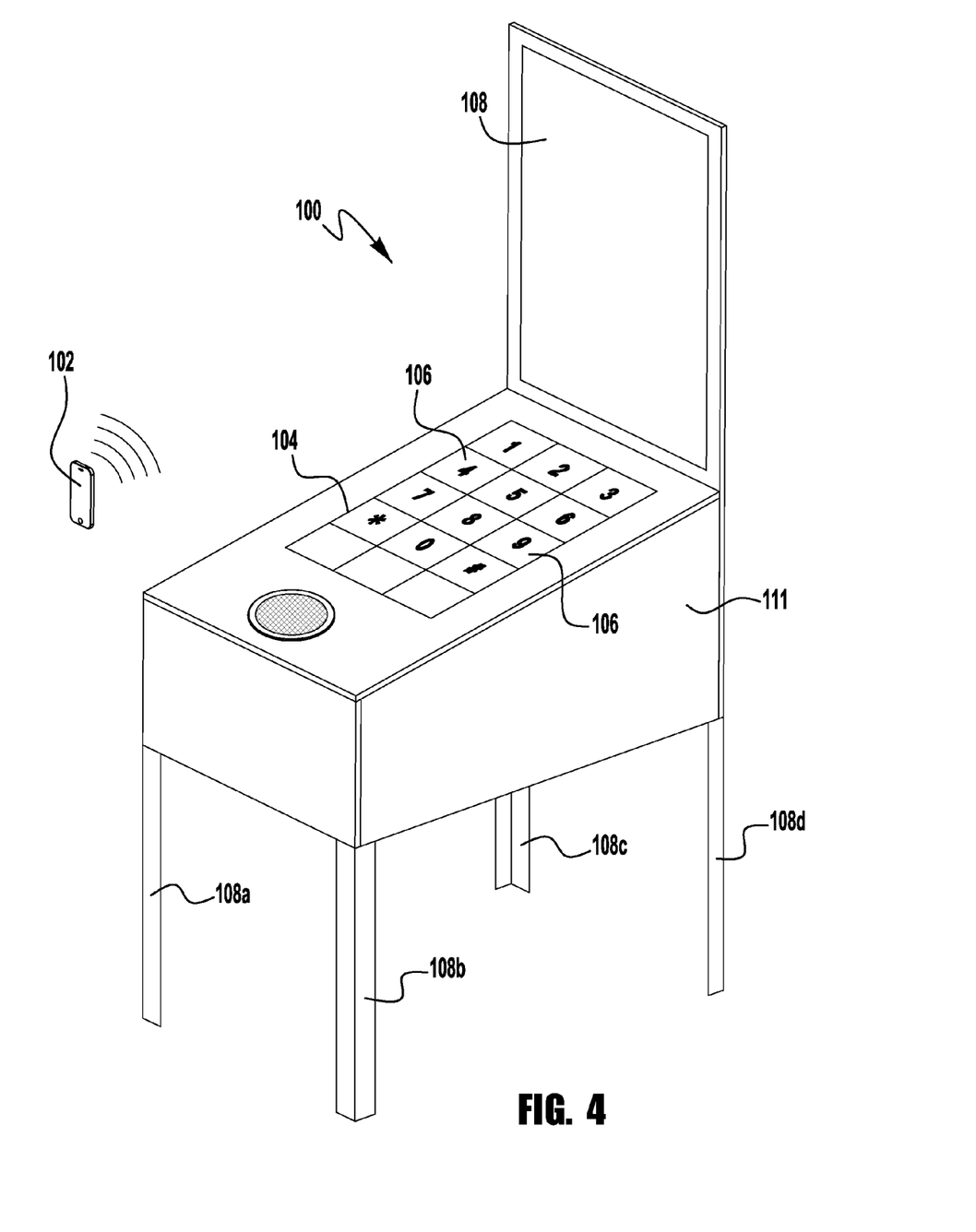
FIG. 4 is a front three-dimensional view of a second embodiment of the cell phone table with a wirelessly connected mobile device, in accordance with the present invention.

FIGS. 3 and 4 illustrate a second embodiment of the cell phone table 100. In general, the second embodiment operates much like the cell phone table 10, in that the second embodiment is designed to interface with a mobile device 102, to modify and interact with content on the mobile device. By virtue of establishing a connection between the mobile device 102 and the cell phone table 100, an image as shown on the mobile device may also be viewed on the cell phone table. Further, a user will have the ability to control the content and features on the mobile device 102 with the cell phone table 100. The user may modify the content on the mobile device 102 with the cell phone table 100, which may in turn cause the modified content to be displayed on the cell phone table. However, the second embodiment of the cell phone table 100 utilizes a keypad 104 with a plurality of tactile buttons 106 for receiving user input to modify and interact with content on the mobile device, and a separate display screen 108, which may or may not utilize touch screen technology. The buttons can be about 4 inches by 4 inches square. Further, as seen in FIG. 4, the cell phone table 100 can include a microphone 113 to allow a user to speak into the table when making a phone call, or otherwise speak commands into the table.

As illustrated in FIG. 3, the two front legs 108a and 108b may be of a first height, and two rear legs 108c and 108d may be of a second height, which is greater than the first height of legs 108a and 108b. This causes the upper surface 110 of the cell phone table 100 to have a sloping effect. Alternatively, the legs 108a-108d may be of the same length, and the support structure 111 mounted beneath the cell phone table may be built such that the upper surface 110 is presented in a sloping fashion. The support structure 111 mounted beneath the cell phone table is typically adapted to house all of the electronics (not shown), such as the processor described before with respect to the first embodiment, which operate and power the cell phone table 100.

In the present embodiment of the cell phone table 100, a plurality of keys or buttons 106 are embedded within a key pad device 104 of the upper surface 110 that serve as input devices of the mobile device 102. However, it should be noted that such keys or buttons 106 need not be present, and rather the display screen 108 can serve as the primary or only user input device, especially if the screen incorporates touch sensitive technology. An upper surface 109 of the cell phone table 100 incorporates the display screen 108, which is embedded therein. The tactile buttons 106 and the display screen 108 are interconnected, such that the commands made by engaging the buttons on the keypad 104 may be seen upon the display screen.

As with the first embodiment of the cell phone table 100, the mobile device 102 may connect to the second embodiment of the cell phone table 100 in any desired appropriate fashion. For example, as illustrated in FIG. 3, mobile device 102 interfaces with the table 100 utilizing a docking station 112. Docking station 112 is a housing which may include a upper of external connectors that may be used to connect the cell phone table 100 to the mobile device 102. For example, these connectors may include one or more video connectors, audio connectors, a network connector, or other connectors. The docking station 112 may be placed in any desired location on the cell phone table 10, such as the edge 110a of upper surface 110. As illustrated, the docking station 112 is disposed on upper of the upper table surface 110 but it is within the terms of the embodiment that the docking station be disposed within a recess (not shown) of the upper table surface.

Typically, the connectors within the docking station 112 will be attached to a wire 114 that is connected directly to a processor (not shown) that operates the tactile buttons 106 and separate display screen 108 of cell phone table 100. Once the mobile device 102 is placed in the docking station 112, the cell phone table 100 may use the tactile buttons 106 and separate display screen 108 to access and command the connected mobile device. The display screen 108 will be utilized to display what would normally be displayed on the display 102a of the mobile device 102. In some implementations, the docking station 112 may also include the ability to charge a battery of the mobile device 102 when it is connected to the docking station. It should be noted that the embodiment contemplates that the mobile device 102 is connected directly to the processor via the wire 114 without the use of the docking station 112.

Alternatively, the mobile device 102 may be connected wirelessly to the display screen 108 of the cell phone table 100, as illustrated in FIG. 4. The content from the mobile device 102 that is controlled on the display screen 108 can be accessed from a Bluetooth connection, a Wi-Fi connection, a cellular communications connection, or any other wireless connection. After the mobile device 102 is wirelessly connected to the cell phone table 100, the display screen 108 may be utilized to access and command the connected mobile device.

The cell phone table 100 includes one or more control server devices and one or more relay server devices, (which are equivalent to the components of the first embodiment as seen in FIG. 6); and the control server device may communicate with multiple relay server devices to select one or more of the relay server devices for transferring or relaying content between the mobile device 102 and the cell phone table.

Figure 5:
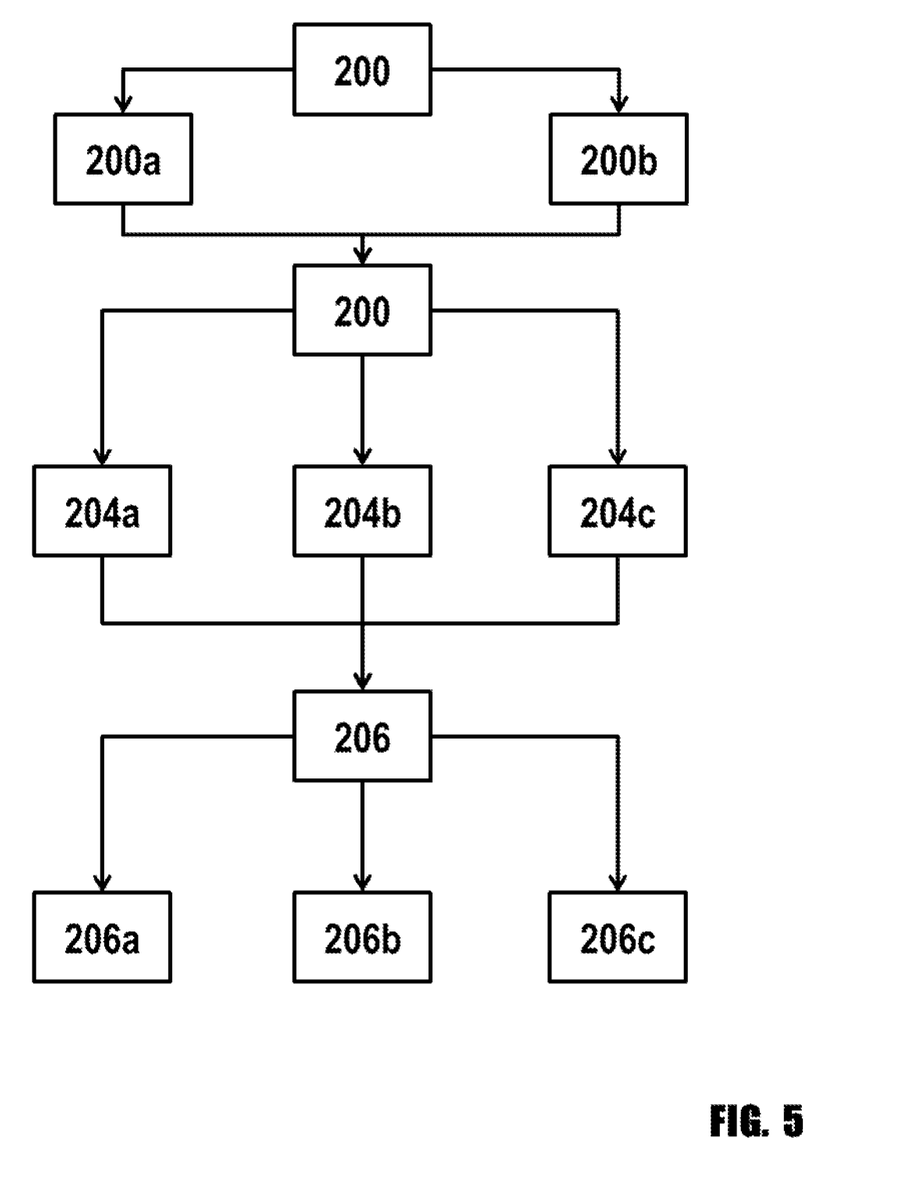
FIG. 5 is a view of the steps of use of the cell phone table, in accordance with the present invention.

In use, the first embodiment of the cell phone table 10 and the second embodiment of the cell phone table 100 operate almost identically, other than how each embodiment interfaces with the mobile device 10, 102. FIG. 5 illustrates the steps of operation.

First, in step 200, a connection between the mobile device 12 and the cell phone table 10 is established before communication between the device and table may occur. In step 200a, as illustrated in FIG. 5, the interconnection is a wired connection utilizing a docking station 22 which houses mobile device 12. The docking station 22 links the mobile device 12 to the touch sensitive screen 20 via connectors. In step 200b, other forms of connections between the mobile device 12 and the touch sensitive screen 20 can be implemented, including wireless connections such as a Bluetooth connection.

In step 204, a connection manager may be incorporated to manage connections between the mobile device 12 and the cell phone table 10. Such management may include step 204a of authenticating users (e.g., via a login and password) requesting access to content on the cell phone table 10 via the mobile device 12. Such management may also include step 204b of establishing a connection between the mobile device 12 and the touch sensitive screen 20. As an example, the connection manager may establish such a connection by disseminating information between devices so that the devices may know how to contact and communicate with other devices. The disseminated information may include access codes that uniquely identify individual display devices. The access codes may be generated by the connection manager and sent to the cell phone table 10 and the mobile device 12. In step 204c, management by the connection manager may also include determining an appropriate connection type between the mobile device and the cell phone table 10 (e.g., cloud connection, direct connection, or location-based connection) and tracking a user's interactions with a software application. The connection manager may perform numerous other functions in other embodiments.

In step 206, the user has established a connection between the mobile device 12 and the cell phone table 10. Now, the user may operate the mobile device 12 via the cell phone table 10. In step 206a, the user may use the touch screen 20 to make a phone call. In step 206b, the user may access pictures within the mobile device 12 to be displayed upon the screen 20. In step 206c, the user may send or receive an email from the mobile device 12 via the touch screen 20.

It should be noted that the above flow chart operationally functions identically regardless of whether the first or second embodiment of the cell phone tables 10 and 100 is used. The only practical difference is whether the touch screen 20 is utilized, as with the first embodiment of cell phone table 10 is used, or the buttons 106 of the second embodiment of the cell phone table 100 is used.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A cell phone table to interface with a mobile device, comprising:
   a mobile device electronically connected to the cell phone table;
   a touch sensitive screen disposed upon an upper surface of the cell phone table for interacting with content on the mobile device;
   a support structure mounted beneath the cell phone table to hold electronic components which operate and power the cell phone table;
   a plurality of legs that support the cell phone table and touch sensitive screen; and
   a microphone is disposed within the upper surface of the cell phone table.

2. The cell phone table of claim 1 wherein the upper surface of the cell phone table has a recess which houses the touch sensitive screen whereby the touch sensitive screen disposed therein is flush with the upper surface.

3. The cell phone table of claim 1 wherein the touch sensitive screen:
   has processing capabilities for displaying images purely or substantially based upon signals generated by and received from the mobile device and communicated to the touch sensitive screen, and for relaying commands that are executed by the mobile device; and
   has the ability to receive or sense touch type input.

4. The cell phone table of claim 1 wherein the mobile device interfaces with the cell phone table utilizing a docking station having a plurality of external connectors to connect the cell phone table to the mobile device.

5. The cell phone table of claim 4 wherein the external connectors within the docking station will be attached to a wire that is connected directly to the touch sensitive screen, such that the cell phone table may use the touch sensitive screen to access and command the connected mobile device.

6. The cell phone table of claim 1 wherein the mobile device is connected wirelessly to the touch sensitive screen of the cell phone table, allowing the touch sensitive screen to access and command the connected mobile device.

7. The cell phone table of claim 1 wherein the touch sensitive screen:
   includes one or more control server devices and one or more relay server devices; and
   the control server device may communicate with multiple relay server devices to select one or more of the relay server devices for transferring or relaying content between the mobile device and the touch sensitive screen.

8. A cell phone table to interface with a mobile device and interact with content on the mobile device, comprising:
   a mobile device that is electronically connected to the cell phone table;
   a display screen embedded within an upper surface of the cell phone table to display identical with a display of the mobile device;
   a keypad device mounted on the upper surface of the cell phone table for receiving user input to modify and interact with the mobile device;
   a support structure mounted beneath the cell phone table adapted to house all of electronics which operate and power the cell phone table;
   a plurality of legs that support the cell phone table, the keypad device and the display screen; and
   a microphone is disposed within the upper surface of the cell phone table.

9. The cell phone table of claim 8 wherein the plurality of legs includes two front legs having a first height, and two rear legs having a second height which is greater than the first height of the two front legs and which causes the upper surface of the cell phone table to have a downward slope from the rear legs to the front legs.

10. The cell phone table of claim 8 wherein the plurality of legs are the same height and the upper surface has a downward slope from the rear legs to the front legs.

11. The cell phone table of claim 8 wherein the upper surface includes a plurality of keys embedded within the key pad device that receive user input to modify and interact with content on the mobile device.

12. The cell phone table of claim 11 wherein the keys and the display screen are interconnected, such that the commands made by engaging the keys embedded within the key pad device are seen on the display screen.

13. The cell phone table of claim 8 wherein the display screen embedded within the upper surface is a touch screen.

14. The cell phone table of claim 8 wherein the mobile device interfaces with the cell phone table utilizing a docking station, said docking station having a plurality of external connectors to connect the cell phone table to the mobile device.

15. The cell phone table of claim 14 wherein the connectors within the docking station will be attached to a wire that is connected directly to the touch sensitive screen, such that the cell phone table may use the touch sensitive screen to access and command the connected mobile device.

16. The cell phone table of claim 8 wherein the touch sensitive screen:
- includes one or more control server devices and one or more relay server devices; and
- the control server device may communicate with multiple relay server devices to select one or more of the relay server devices for transferring or relaying content between the mobile device and the cell phone table.

* * * * *